Dec. 7, 1965 A. M. MASTERS 3,222,018
BOARD MOUNTING MEANS
Filed May 11, 1961 3 Sheets-Sheet 1
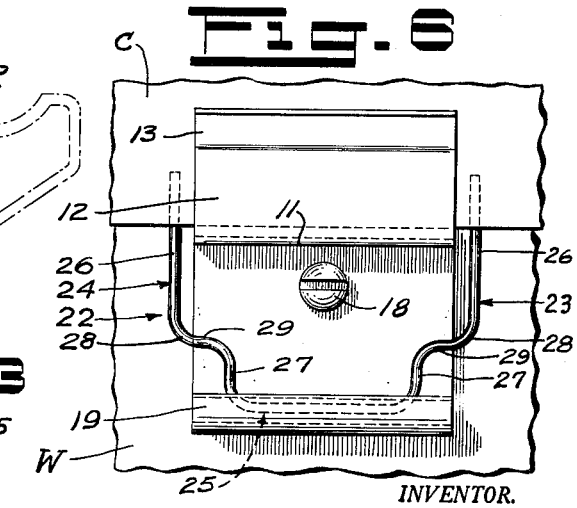
INVENTOR.
ALBERT M. MASTERS
BY John M. Montstream
ATTORNEY Dec. 7, 1965  A. M. MASTERS  3,222,018
BOARD MOUNTING MEANS
Filed May 11, 1961  3 Sheets-Sheet 2
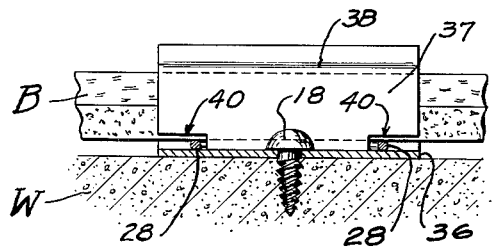
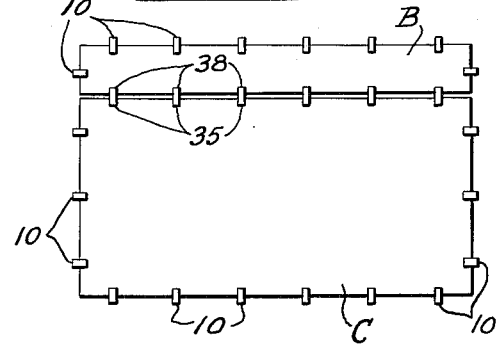
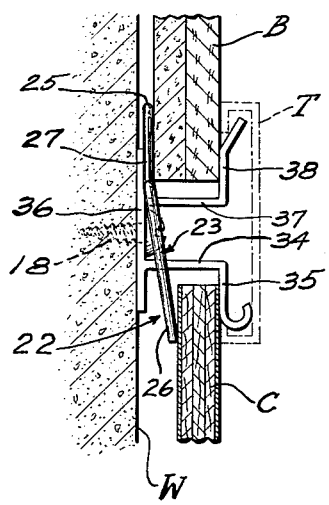
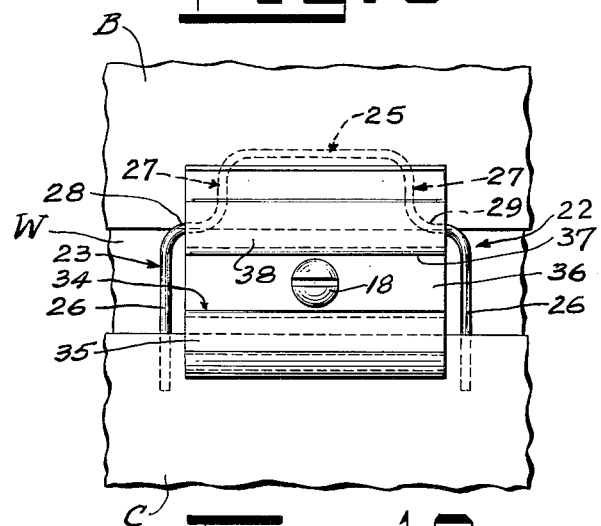
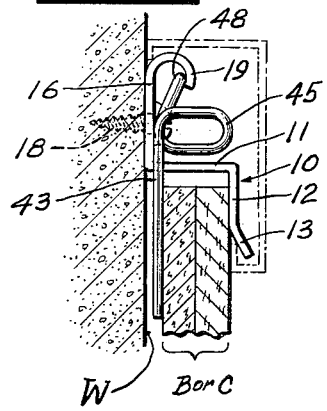
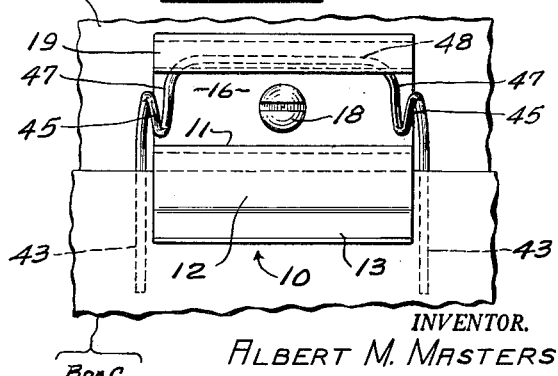
INVENTOR.
ALBERT M. MASTERS
BY
John M. Montstream
ATTORNEY Dec. 7, 1965    A. M. MASTERS    3,222,018
BOARD MOUNTING MEANS
Filed May 11, 1961    3 Sheets-Sheet 3

INVENTOR.
ALBERT M. MASTERS
BY
John M. Montstream
ATTORNEY

United States Patent Office 3,222,018
Patented Dec. 7, 1965

3,222,018
BOARD MOUNTING MEANS
Albert M. Masters, P.O. Box 155, Pen Argyl, Pa.
Filed May 11, 1961, Ser. No. 111,418
11 Claims. (Cl. 248—28)

This application is a continuation-in-part of application Serial No. 46,667, filed August 1, 1960, now abandoned.

The invention relates to a mounting means for a board such as chalkboard or corkboard or both. The mounting means uses two elements solely, namely a clip which is secured to the wall and a U-shaped spring clamping means having legs which are flexed to clamp the board and the spring clamp is held in flexed condition by being flexed and moved longitudinally to bring a portion of the clamping means underneath a locking means. The clip is of such form that it can be extruded into long bars and then merely cut crosswise to form the clip. No additional fabrication is necessary except to provide a hole to receive a screw by which the clip is secured to a wall and in a dual board clip by slotting the opposite edges of the clip. The mounting means herein shows a form having advantages over that shown in Patent 3,008,249, November 14, 1961.

It is an object of the invention to provide a board mounting means of a clip and a resilient or spring clamping means such that long bars may be extruded of the cross section of the clip and then the bars are cut to a desired width of clip with a minimum of additional fabrication to complete the clip.

Another object is as above in which the additional fabrication for the clip is solely in providing aperture means for a screw.

It is another object of the invention to construct a board mounting means in which the spring clamping means is of spring wire bent into a generally U-shaped form to provide an inexpensive clamping means.

Another object is to construct a board mounting means comprising a dual clip for two adjacent boards of a form which is cut from a long extruded bar and using a spring clamping means of U-shaped form.

A still further object is as above and in which one form and size of clamping means is used for both a dual and a single board clip.

Other objects of the invention will be more apparent from the following description when taken in connection with the accompanying drawings illustrating preferred embodiments thereof in which:

FIG. 1 is a front view of the mounting means secured to a wall and clamping a board therein;

FIG. 2 is a side view of the mounting means of FIG. 1;

FIG. 3 is a front view of a dual mounting means for mounting two boards in adjacent relation;

FIG. 4 is a side view of the mounting means of FIG. 3;

FIG. 5 is a sectional view taken on line 5—5 of FIG. 3;

FIG. 6 is a front view of board mounting means of longer dimension for the bottom of a chalkboard so that the clip supplies adequate support for a chalk rail;

FIG. 7 is a side view of the mounting means of FIG. 6;

FIG. 8 is a front view of another dual mounting means for securing a chalkboard and a corkboard or the like in spaced relationship with the corkboard above the chalkboard;

FIG. 9 is a side view of the mounting means of FIG. 8;

FIG. 10 is a front view of a chalkboard and corkboard mounting;

FIG. 11 is a side view of a mounting means using a looped clamping means;

FIG. 12 is a front view of the mounting means of FIG. 11;

FIG. 13 is a side view of the spring clamping means in unflexed condition;

Figure 14:
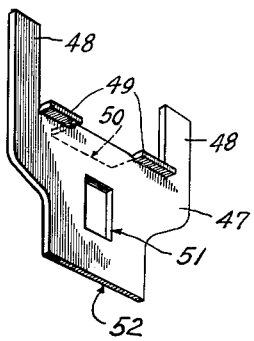
FIG. 14 is a perspective view of a clamping means having straddle clamping legs as stamped from sheet metal.

Heretofore mounting means were constructed in which a clip means carried the fulcrum means for the clamping means which fulcrum was provided by an edge carried by the ledge.

Also clips for mounting means for chalk, cork and like boards were stamped out of sheet metal in blank form and then shaped into desired form by one or more additional stamping operations. Because of the stamping and shaping dies needed and the labor and handling involved, such clips are relatively expensive. The same is true of the spring clamping means heretofore used.

The mounting means of FIGS. 1 and 2 includes a clip 10 having ledge means including a ledge 11 with front and rear edges and a depth greater than the thickness of the board to be mounted. A front flange 12 is integral with the front edge of the ledge and extends in one direction at right angles thereto. Preferably the end edge 13 is inclined outwardly so that it may serve to secure a trim strip T to the clip.

A rear flange 16 is integral with and extends at right angles to the ledge 11 and extends in a direction with respect to the ledge oppositely from the direction in which the front flange 12 extends. This rear flange has an aperture means 17 by means of which the clip is secured to a wall such as by a screw 18 passing through the aperture means. Locking means is carried by the rear flange which may take several forms, that shown being a shoulder 19 carried by the clip adjacent to the rear flange as formed by a loop or curl extending along the end or remote edge of the rear flange so that it is a substantial distance from the ledge. The shoulder extends the full width thereof.

In the clip described, all parts extend the full width thereof so that long bars of the shape of the end thereof as shown in FIG. 2, can be extruded and the clip formed merely by cutting or slicing the bar cross wise of the desired width. Both of the side edges of the forward flange, the ledge and the rear flange are in the same plane or in alignment. The only other fabrication necessary to complete the clip of FIGS. 1 and 2 requires solely drilling of the aperture means or hole 17. Because the shape is secured by an extrusion process, the manufacturing cost of making the clips is very low.

The spring clamping means used with the clip is provided with spaced legs which straddle the ledge and has a portion engaging the rear flange as a fulcrum and bent at an obtuse angle with respect to the straddle portion of the legs. An inexpensive clamp may be formed from wire having a uniform cross sectional dimension throughout its length. The clamping means 22 is of U-shaped or generally U-shaped form having spaced legs 23 and 24 and a connecting portion 25. Each leg has an end or outer portion 26 and an inner portion 27. The end portions of the two legs are spaced far enough apart to straddle a ledge. At the midsection of the legs there is an inwardly direction or first bend 28 so that at least at the bend extends over the rear flange or the bends of the two legs are spaced apart a distance less than the width of the clip. This provides a fulcrum point on the clamping means upon which the legs are flexed as will appear. The bend 28 also provides a stop in that it engages the ledge of the clip to properly position the clamp initially. In the construction particularly illustrated, the inner leg portion 27 continues spaced apart a distance less than the width of the clip to the connecting portion although this spacing is not essential. As viewed in FIG. 2 the clamping means has a second bend 29 in the midsection of the clamp and with the clamp shown in the midsection of the legs so that the end leg portion and inner clamp or leg portion extend at an obtuse angle with respect to each other as particularly shown in FIG. 13. This obtuse angle is such that with the legs engaging the back of a board and the fulcrum of the clamping means engaging the rear flange, the interlocking portion or connecting bar is spaced from the interlocking shoulder of the clip so that the clamping means must be flexed to bring them into aligned position whereupon longitudinal movement of the clamping means brings it into interlocking engagement with the shoulder of the clip.

In FIG. 3, a clip is shown of the dual type, that is, it is constructed so that the upper edge of a board such as a chalkboard is clamped to the clip and adjacent thereto, the lower edge of an upper board such as a corkboard is secured to the clip. The clip 33 has ledge means including a ledge 34 with a front edge and a rear edge and a depth greater than the thickness of a board to be mounted. Integral with the front edge of the ledge 34 is a front flange 35 which extends in one direction at right angles to the ledge. The rear edge of the ledge has a rear flange 36 integral therewith and extending at right angles to the ledge with a portion thereof extending in a direction oppositely from that of the forward flange. This rear flange has a screw hole or aperture means 17 through which a screw 18 projects to secure the clip to a wall W.

Spaced from and parallel with the ledge 34 is a second ledge 37, the rear edge of which is integral with the rear flange 36. This ledge has a depth greater than the thickness of the board to be mounted. The ledge 37 has a forward edge and a second front flange 38 is integral therewith and extends therefrom in a direction oppositely to the direction of the first front flange 35. Preferably the two front flanges are in the same plane. The rear flange 36 extends upwardly beyond the second ledge 37. On the front face and shown at the upper edge of the rear flange 36 is a pointed ridge 39 extending across the width of the clip which ridge is spaced from the second ledge 37 and spaced from the second front flange 38 a little less than the thickness of the board which as shown is a corkboard B. The second ledge 37 has a slot 40, FIG. 5, extending inwardly from each edge thereof and at or adjacent to the rear flange 36 forming a locking means for the clamping means as will appear. The spacing between the inner edges of the slots 40 is approximately the same as or slightly less than the spacing between the connecting portion 27 of the legs of the clamp 22. The ridge 39, therefore, also forms a part of the locking means with this form of clip. This clip uses the resilient wire clamping means 22 of FIGS. 1, 2 and 13.

This clip in all its parts is uniform throughout its lateral dimension or width so that it can be extruded in long bars and the clip formed merely by cutting or slicing through the bar to form clips of desired width. This dual form of clip with the rear flange extending on both sides of the ledges to form a long base for engaging the wall, is one which cannot be formed by bending from a flat blank or would be very expensive to form in a somewhat similar form. Each edge of the flanges and the ledges are, therefore, in one right angular plane. The sole additional fabrication for this clip is to drill the screw hole or aperture means 17 and to cut the slots 40 so that there is a minimum of manual labor required in the manufacture of the clips.

The construction of FIG. 7 is structurally the same as that of FIG. 2 and need not be again described. It differs solely from the construction of FIG. 2 in being of greater length so that it may be used at the bottom of the chalkboard C and has a length sufficient to adequately support a chalk rail R thereon which is snapped on. This clip uses the spring clamp 22 of FIGS. 1 through 4 so that for all three forms of clips described a single form and size of clamping means may be used.

FIGS. 8 and 9 show a dual clip which is identical with the dual clip of FIGS. 3 and 4 excepting that it lacks the pointed projection 39 and does not have the slots 40 in the lower ledge. It is for this reason that all the parts thereof are similarly numbered with those of the clip of FIGURES 3 and 4. This construction also uses the spring clip 22 previously described. This clip also is uniform across the width of the clip so that it may be extruded as a long bar and sliced or cut to a desired width from the bar as one step in its formation. A second step solely is required namely the drilling of the hole or aperture means 17 through the rear flange for the screw 18.

In mounting two boards on a wall one above the other, a plurality of clips are secured to the wall along a line where the bottom edge of the board is to be located, in alignment and spaced apart any suitable distance such as one or one and a half feet. A chalkboard C is then placed on the ledges of the lower line of spaced clips and a plurality of dual clips 33 are secured to the wall and with the front flange 35 overlapping the upper edge of the board. A spring clamping means or clamp is then inserted for each clip with the legs of the clamping portion of the clamping means straddling the ledge 11 and the ends of the legs engaging the back of the board. The legs of the spring clamping means are then flexed with the bend 28 serving as the fulcrum in engaging the front face of the rear flange so that the connecting portion 25 is in alignment with the locking means 19 whereupon the clamping means or clamp is moved longitudinally so that the connecting portion 25 interengages and locks in the locking means 19 with the clamping means flexed. The bottom of the board is clamped in position by these clips. A spring clamping means or clamp is then inserted behind the upper edge of the board for each clip with the legs straddling the ledge whereupon the clamping means is flexed inwardly towards the rear flange and moved laterally downwardly so that the inner portion 27 of the legs pass into the slots or locking means 40 which locks the clamp in flexed position and the upper edge of the board is clamped against the forward flange 35 of the clip.

The second or corkboard B is then inserted at an angle behind the front flange 38 of the dual clip and the upper edge pressed towards the wall so that the point 39 digs into the board and securely anchors the lower edge of the corkboard to the clip. A plurality of spaced clips 10 is then secured to the wall in alignment with the front flange 12 over the front face of the corkboard. A spring clamping means for each clip is then inserted with its legs 26 behind the corkboard whereupon the clamping means is flexed by pressing the connecting portion of the clamping means inwardly into alignment with the locking means 19 and then moving the clip longitudinally or upwardly so that the connecting portion 25 is underneath the locking means or shoulder 19. The clamping means is locked thereby in flexed or clamping condition.

If there is to be no corkboard above the chalkboard then when the chalkboard C has been inserted on the lower line of clips, a series of clips 10 are secured to the wall as described in connection with FIG. 4 and the board is clamped against the front flange 12 in the same manner with resilient clamping means 22.

Many times two boards are mounted in side by side relation with the vertical board edges in abutting relation.

At these edges mounting means are not provided or the mounting means herein, when not so mounted or at the outer edges of a series of boards, mounting means are provided along the vertical edges in the manner described using clips 10.

A slightly different construction of duel clip is shown in FIGS. 8 and 9 in that the spring clamping means or clamp is used to anchor or secure both the upper edge of the chalkboard C and the lower edge of another board such as a corkboard B. In this construction, the dual clip is mounted as previously described and the spring clamping means 22 is inserted with the end portion 26 straddling the ledges 34 and 37 and with the bend 28 resting against the upper ledge 37. The board B is then pressed downwardly between the front flange 38 which flexes the legs of the clamp and simultaneously clamps the upper edge of the chalkboard C and the lower edge of the corkboard B. It is clear that the clamping means may be initially flexed rearwardly and the corkboard B then inserted and pressed downwardly between the front flange 38 and the clamping means. A series of mounting clips 10 as shown in FIGS. 1 and 2 are secured to the wall in alignment at the upper edge of the corkboard and the corkboard clamped in position by insertion of a flexible clamping means 10 as described above. In this construction it is the second board or corkboard which locks or holds the clamping means in flexed clamping condition. In other words, the corkboard constitutes locking means for the clamping means.

Although the figures disclose a flexible clamping means shaped by bending a wire into a generally U-shaped form, the clamping means need not be made of wire although this provides an inexpensive resilient clamping means or clamp as described. It is essential that the U-shaped clamping means have legs or clamping leg portions which are spaced apart so that the legs straddle the ledge or ledges of the clip and that the legs clamping leg portions be bent at an obtuse angle with respect to the inner portion of the clamping means in the region of the midpoint or the midsection of the clamping means.

The ledges have been described as having a depth greater than the thickness of the board to be mounted. When two boards are to be mounted in adjacent relation with a dual clip, or when boards of two thicknesses are to be mounted, it is desirable that the ledges have a depth greater than the board of greater thickness. A single size of clip then can be used for either board. The depth of the ledge is a little greater than the thickness of the thicker board so that the clamping means may be inserted easily in back of any thicker board. The clamping portion or legs of the clamping means need be spaced apart wider than the width of the clip solely at the ledge where it must straddle the same.

FIGS. 11 and 12 show a mounting means using the clip 10 and a looped form of U-shaped clamping means 43 of bent resilient wire having legs or a clamping portion 44 spaced apart a distance greater than the width of the clip to straddle the ledge 11 of the clip. The fulcrum for each leg of the clamping means is formed by a loop or spiral 45 which spirals upwardly and downwardly and inwardly over the front face of the rear flange for at least one loop and engages the front face to provide a fulcrum. The loop shown is oval although it may have other shapes. The connecting and locking portion of the clamping means is formed by the leg portions 47 and the connecting bar 48 at the end thereof. The clamping portion and connecting portion of the clamping means are at an obtuse angle with respect to each other when unflexed so that when the clamping portion is in back of a board B or C the clamping means must be flexed by pressing the connecting portion downwardly to bring the connecting bar 48 below the locking shoulder 19 of the clip 10 whereupon lateral movement of the clamping means will bring the connecting bar behind the shoulder and will lock the clamping means in flexed condition to clamp the board. The loop is of such size that it will fit within a trim strip such as T of FIG. 1. This loop form of clamping means increases the flexibility of the same or permits use of a heavier wire.

All of the clips have front flange means including at least one front flange. In the dual clips of FIGS. 3, 4 and 5 and FIG. 8 and 9 there are two spaced ledges and two or a first and a second front flange extending in opposite directions from its respective ledge. In all clips illustrated the parts extend the full width of the clip so that all clips are cut from a long extruded bar merely by slicing directly across the bar to provide any desired width of clip. Each edge of all ledges and flanges are therefore in alignment or in one plane. The locking shoulder 19 of the clip is shown as a curl at the edge of the rear flange and directed toward the ledge, however, the locking shoulder need not extend in this direction.

FIG. 14 illustrates a flexible clamping means 47 of a type which may be punched from sheet metal and useable with any one of the clips shown in FIG. 1, 6 and 12. This clamping means has a clamping portion formed by a pair of legs 48 spaced apart a distance so that the legs will straddle the ledge of the clip or clip means. At a midsection of the clamping means between the ends thereof is outwardly extending fulcrum means 49 integral with the clamping means and shown as flange means extending at right angles thereto. The fulcrum means as particularly shown are portions from between the legs struck outwardly or at right angles to the clamping means. The end edges of this fulcrum means engage the front face of the rear flange of the clip and provides a fulcrum for pivoting of the clamping means. Preferably a second fulcrum flange means 50 is also located at the midsection of the clamping means and integral therewith and extending outwardly from the clamping means or particularly at right angles. It is struck from material of the sheet metal between the legs. This second fulcrum means extends in the opposite direction from the first fulcrum means to form a second fulcrum for the clamping means.

The two fulcrum means have a different dimension from the clamping means so that for a thicker board to be clamped, the shorter fulcrum means 49 engages the front face of the rear flange of the clip means. For a thinner board to be clamped, the clamping means is turned so that the longer fulcrum means 50 engages the front face of the rear flange of the clip means to raise the level of the clamping means with respect to the rear flange of the clip means. The clamping means may have an aperture 51 to be engaged by a suitable tool to flex to the clamping means and shift it longitudinally to bring the locking means into interengagement or particularly to bring the interengaging edge 52 underneath the locking shoulder 19 on the clip means. This clamping means is used in the same manner as those described in FIGS. 1, 6 and 12.

Figure 16:
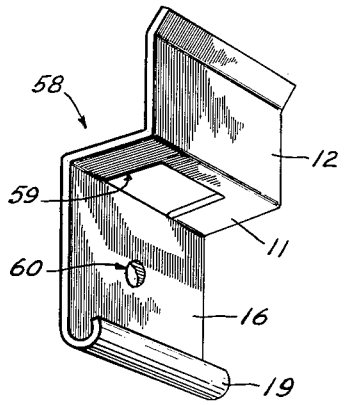
FIG. 16 is a perspective view of a clip means of another form.
Figure 15:
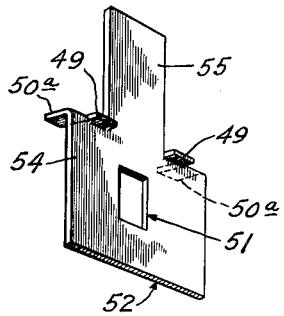
FIG. 15 is a perspective view of another form of clamping means stamped from sheet metal.

FIG. 15 illustrates a flexible clamping means 54 somewhat similar to that of FIG. 16, however, it does not have the spaced legs. Instead it has a single leg 55 narrower than the overall width of the clamping means and of the ledge 11 of the clip means as will appear. The clamping means has fulcrum means 49 and 50a essentially as shown in the clamping means of FIG. 14 which function in the same manner. The clamping means 54 is used with the clip means 58 as shown in FIG. 16 and the same clip means parts are similarly numbered as used in FIGS. 1, 6 and 12. The ledge 11 has a central ledge opening 59 therein.

Figure 17:
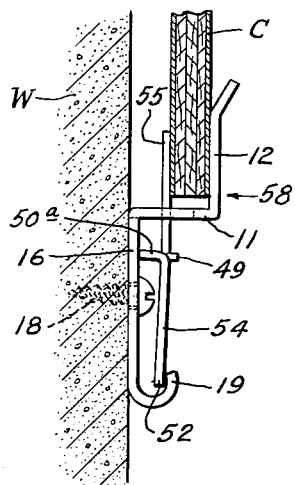
FIG. 17 is a side view of the mounting means of clamping means of FIG. 15 and clip of FIG. 16 assembled together with a board.

The mounting means of FIGS. 15, 16 is used as shown in FIG. 17 wherein the clip means is secured to a wall with the edge of a board to be clamped behind the front flange of the clip means. The clamping means has its leg or clamping portion 55 inserted through the opening 59 in the ledge so that the clamping portion engages the rear face of the board C. Pivoting of the clamping means on the fulcrum means 50a and flexing the clamping means inwardly brings the interengaging edge 52 of the clamping means below the shoulder 19 of the locking means whereupon longitudinal movement of the clamping means by sliding the edges of the fulcrum flange means along the front face of the rear flange brings the interengaging edge under the locking shoulder to thereby clamp the board against the front flange of the clip means and lock the clamping means in flexed position.

The clip means or clip 58 of FIG. 16 has the side edges of the front flange, the ledge and the rear flange in one plane so that the clip in the form shown can be extruded as a bar and this bar then cut to the desired width of the clip means. An aperture 60 in the rear flange, for a screw 18 for attaching the clip means to a wall, is punched and the opening 59 through the ledge is cut or punched. These three operations are all that is needed to manufacture the clip and provides an inexepnsive method of manufacture. The clip also can be punched out of strip metal and bent or punched into the form shown.

Figure 18:
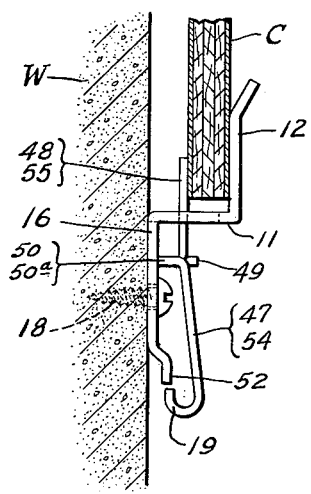
FIG. 18 is a partial view of a modification of the locking means.

FIG. 18 shows mounting means with a reversal of the parts of the locking means in that the locking shoulder 19 is carried by the clamping means and the interengaging edge 52 is the edge of the clip means. In securing interlocking interengagement of this locking means, the end of the clamping means with its shoulder is flexed inwardly and then the clamping means is shifted longitudinally towards the ledge.

This invention is presented to fill a need for improvements in a board mounting means. It is understood that various modifications in structure, as well as changes in mode of operation, assembly, and manner of use, may and often do occur to those skilled in the art, especially after benefiting from the teachings of an invention. This disclosure illustrates the preferred means of embodying the invention in useful form.

What is claimed is:

1. A mounting means for mounting on a wall at least one board such as a chalkboard or corkboard or both and having thickness comprising a clip cut from an extruded bar having ledge means including at least a first ledge with a forward edge and a rear edge and a depth adapted to receive a board of the desired thickness, a forward flange integral with the forward edge and extending at right angles to the ledge in one direction, a rear flange integral with the rear edge extending at right angles to the ledge and having at least a portion extending in the opposite direction to that of the forward flange and having a front face, the rear flange having aperture means to secure the clip to a wall, the ledge means and flanges being of the same width and having side edges in the same plane, clamping means having a connecting and locking portion and having resilient legs extending therefrom and forming a clamping portion, the legs of the clamping portion being spaced apart a distance to straddle the edges of the ledge, the clamping means having an obtuse angle bend at the midsection of the clamping means so that the clamping portion and the connecting and locking portion extend at an obtuse angle with respect to each other, the clamping means engaging the front face of the rear flange at the midsection of the clamping means as a fulcrum point; the angle being such that with the fulcrum of the clamping means engaging the front face of the rear flange the clamping means must be flexed to clamp a board, and means carried by the clip forming at least a part of a holding means to hold the clamping means flexed.

2. Mounting means for mounting on a wall at least one board such as a chalkboard or corkboard or both and having thickness comprising a clip cut from an extruded bar having ledge means including at least a first ledge with a forward edge and a rear edge and a depth adapted to receive a board of the desired thickness, a forward flange integral with the forward edge and extending at right angles to the ledge in one direction, a rear flange integral with the rear edge extending at right angles to the ledge and having at least a portion extending in the opposite direction to that of the forward flange and having a front face, the rear flange having aperture means to secure the clip to a wall, the ledge means and flanges being of the same width and having side edges in the same plane, clamping means having a connecting and locking portion and having resilient legs extending therefrom and forming a clamping portion, the legs of the clamping portion being spaced apart a distance to straddle the edges of the ledge, the clamping means having an obtuse angle bend at the midsection of the clamping means so that the clamping portion and the connecting and locking portion extend at an obtuse angle with respect to each other, the clamping means engaging the front face of the rear flange at the midsection of the clamping means as a fulcrum point, the obtuse angle being such that with the fulcrum of the clamping means engaging the front face of the rear flange the clamping means must be flexed to clamp a board, locking means carried by the clip at a substantial distance from the ledge and adjacent to the rear flange, the obtuse angle being such that the clamping means must be flexed to bring the connecting and interlocking portion into alignment with the locking means; and the connecting and locking portion of the clamping means being brought into interlocking engagement with the locking means on longitudinal movement of the clamping means with respect to the clip and locking means.

3. A mounting means as in claim 2 in which the ledge means is a single ledge, and the locking means is a locking shoulder carried by the rear flange spaced a substantial distance from the ledge and adjacent to the rear flange, and the locking shoulder extending across the ful width of the rear flange.

4. A mounting means for mounting on a wall at least one board such as a chalkboard or corkboard or both and having thickness comprising a clip having ledge means including at least a first ledge with a forward edge and a rear edge and a depth adapted to receive a board of the desired thickness, a forward flange integral with the forward edge and extending at right angles to the ledge in one direction, a rear flange integral with the rear edge extending at right angles to the ledge and at least in the opposite direction to that of the forward flange and having a front face, the rear flange having aperture means to secure the clip to a wall, the ledge means and flanges being of the same width and having side edges in the same plane, a spring clamp of wire of U-shaped form having legs and a connecting bar, the wire being of uniform dimension throughout the length of the clamping means, each leg having a clamping portion and a connecting portion extending on opposite sides of a midsection of the leg, the clamping portion of the legs being spaced apart at least at the ledge means a distance to straddle the edges of the ledge means, the legs having a first bend projecting inwardly at the midsection of their length so that at least at this point the legs are spaced apart substantially less than the width of the clip to engage the outer face of the rear flange as a fulcrum, the clamping means having a second bend at the midsection so that the two portions of each leg extend at an obtuse angle with respect to each other; the obtuse angle being such that with the fulcrum of the clamping means engaging the front face of the rear flange the clamping means must be flexed in order to clamp a board, and means carried by the clip forming at least part of a holding means to hold the clamping means flexed.

5. A mounting means for mounting on a wall at least one board such as a chalkboard or corkboard or both and having thicknes comprising a clip having ledge means including at least a first ledge with a forward edge and a rear edge and a depth adapted to receive a board of the desired thickness, a forward flange integral with the forward edge and extending at right angles to the ledge in one direction, a rear flange integral with the rear edge extending at right angles to the ledge and at least in the opposite direction to that of the forward flange and having a front face, the rear flange having aperture means to secure the clip to a wall, the ledge means and flanges being of the same width and having side edges in the same plane, a spring clamp of wire of U-shaped form having legs and a connecting bar, the wire being of uniform dimension throughout the length of the clamping means, each leg having a clamping portion and a connecting portion extending on opposite sides of a mid-section of the leg, the clamping portion of the legs being spaced apart at least at the ledge means a distance to straddle the edges of the ledge means, the legs having a first bend projecting inwardly at the midsection of their length so that at least at this point the legs are spaced apart substantially less than the width of the clip to engage the outer face of the rear flange as a fulcrum, the clamping means having a second bend at the midsection so that the two portions of each leg extend at an obtuse angle with respect to each other, the obtuse angle being such that with the fulcrum of the clamping means engaging the front face of the rear flange the clamping means must be flexed to clamp a board, locking means carried by the clip spaced at a substantial distance from the ledge, and the clamping means being moved longitudinally after flexing to engage the connecting portion with the locking means.

6. A mounting means as in claim 4 in which the first bend extends inwardly solely and each connecting portion extends from the fulcrum parallel to each other and spaced apart less than the width of the clip.

7. A mounting means for mounting on a wall at least one board such as a chalkboard or corkboard or both and having thickness comprising a clip having ledge means including a single ledge with a forward edge and a rear edge and a depth adapted to receive a board of the desired thickness, a forward flange integral with the forward edge and extending at right angles to the ledge in one direction, a rear flange integral with the rear edge extending at right angles to the ledge and at least in the opposite direction to that of the forward flange and having a front face, the rear flange having aperture means to secure the clip to a wall, the ledge means and flanges being of the same width and having side edges in the same plane, a spring clamp of wire of U-shaped form having legs and a connecting bar, the wire being of uniform dimension throughout the length of the clamping means, each leg having a clamping portion and a connecting portion extending on opposite sides of a midsection of the leg, the clamping portion of the legs being spaced apart at least at the ledge means a distance to straddle the edges of the ledge means, the legs having a first bend projecting inwardly at the midsection of their length so that at least at this point the legs are spaced apart substantially less than the width of the clip to engage the outer face of the rear flange as a fulcrum, the clamping means having a second bend at the midsection so that the two portions of each leg extend at an obtuse angle with respect to each other, the obtuse angle being such that with the fulcrum of the clamping means engaging the front face of the rear flange the clamping means must be flexed to clamp a board, a locking shoulder carried by the rear flange and spaced a substantial distance from the ledge and extending across the width of the clip, and in which the first bend is a spiral loop extending inwardly.

8. A mounting means for mounting on a wall a board such as a chalkboard or corkboard having thickness comprising clip means having a ledge, the ledge having a forward edge and a rear edge and a depth between edges adapted to receive a board of the desired thickness, a forward flange integral with the forward edge and extending at right angles to the ledge in one direction, a rear flange integral with the rear edge extending at right angles to the ledge and having at least a portion extending in the oposite direction to that of the forward flange and having an open front face, the rear flange being adapted to be secured to a wall, a resilient clamping means having a fulcrum means at a midsection thereof for engaging the front face of the rear flange, the clamping means having a clamping portion adapted to engage the rear surface of a board with the front surface of the board engaging the front flange of the clip means, locking means carried by the parts including the rear flange of the clip means and the clamping means, the locking means being spaced from the ledge of the clip means and the fulcrum of the clamping means, the locking means including a locking shoulder carried by one part and an interengaging portion carried by the other part, and the locking shoulder and interengaging means of the locking means being spaced from each other forwardly when unflexed and engageable by flexing the clamping means rearwardly and shifting the clamping means longitudinally.

9. A mounting means for mounting on a wall at least one board such as a chalkboard or corkboard or both and having thickness comprising a clip cut from an extruded bar having ledge means including at least a first ledge with a forward edge and a rear edge and a depth adapted to receive a board of the desired thickness, a forward flange integral with the forward edge and extending at right angles to the ledge in one direction, a rear flange integral with the rear edge extending at right angles to the ledge and having at least a portion extending in the opposite direction to that of the forward flange and having a front face, the rear flange having aperture means to secure the clip to a wall, the ledge means and flanges being of the same width and having side edges in the same plane, clamping means having a connecting and locking portion and having resilient legs extending therefrom and forming a clamping portion, the legs of the clamping portion being spaced apart a distance to straddle the edges of the ledge, the clamping means having an obtuse angle bend at the midsection of the clamping means so that the clamping portion and the connecting and locking portion extend at an obtuse angle with respect to each other, the clamping means engaging the front face of the rear flange at the midsection of the clamping means as a fulcrum point; holding means to hold the clamping means flexed, and the obtuse angle being such that with the fulcrum of the clamping means engaging the front face of the rear flange, the clamping means must be flexed and held flexed by the holding means to clamp the board.

10. A mounting means for mounting on a wall at least one board such as a chalkboard or corkboard or both and having thickness comprising a clip having ledge means including at least a first ledge with a forward edge and a rear edge and a depth adapted to receive a board of the desired thickness, a forward flange integral with the forward edge and extending at right angles to the ledge in one direction, a rear flange integral with the rear edge extending at right angles to the ledge and at least in the opposite direction to that of the forward flange and having a front face, the rear flange having aperture means to secure the clip to a wall, the ledge means and flanges being of the same width and having side edges in the same plane, a spring clamp of wire of U-shaped form having legs and a connecting bar, the wire being of uniform dimension throughout the length of the clamping means, each leg having a clamping portion and a connecting portion extending on opposite sides of a midsection of the leg, the clamping portion of the legs being spaced apart at least at the ledge means a distance to straddle the edges of the ledge means, the legs having a first bend projecting inwardly at the midsection of their length so that at least at this point the legs are spaced apart substantially less than the width of the clip to engage the outer face of the rear flange as a fulcrum, the clamping means having a second bend at the midsection so that the two portions of each leg extend at an obtuse angle with respect to each other; holding means to hold the clamping means flexed, and the obtuse angle being such that with the fulcrum of the clamping means engaging the front face of the rear flange of the clip, the legs must be flexed from the fulcrum engaging the rear flange and held flexed by the holding means to clamp a board.

11. A mounting means for mounting on a wall at least one board such as a chalkboard or corkboard or both and having thickness comprising a clip cut from an extruded bar having ledge means including at least a first ledge with a forward edge and a rear edge and a depth adapted to receive a board of the desired thickness, a forward flange integral with the forward edge and extending at right angles to the ledge in one direction, a rear flange integral with the rear edge extending at right angles to the ledge and having at least a portion extending in the opposite direction to that of the forward flange and having a front face, the rear flange having aperture means to secure the clip to a wall, the ledge means and flanges being of the same width and having side edges in the same plane, clamping means having a connecting and locking portion and having resilient legs extending therefrom and forming a clamping portion, the clamping means having an obtuse angle bend at the midsection of the clamping means so that the clamping portion and the connecting and locking portion extend at an obtuse angle with respect to each other, the clamping means engaging the front face of the rear flange at the midsection of the clamping means as a fulcrum point, the angle being such that with the fulcrum of the clamping means engaging the front face of the rear flange whereby the clamping means must be flexed to clamp a board, and means carried by the clip forming at least part of a holding means to hold the clamping means flexed.

References Cited by the Examiner

UNITED STATES PATENTS

| | | | |
|---|---|---|---|
| 1,790,549 | 1/1931 | Masters | 35—63 |
| 1,984,845 | 12/1934 | Smith | 211—87 X |
| 2,842,264 | 7/1958 | Larson | 211—87 X |
| 2,987,832 | 6/1961 | Urbain | 248—28 X |
| 3,001,748 | 9/1961 | Austin | 248—28 |
| 3,008,249 | 11/1961 | Masters | 35—63 |
| 3,038,571 | 6/1962 | Clements | 189—88 |

CLAUDE A. LE ROY, *Primary Examiner.*